(12) United States Patent
Bae et al.

(10) Patent No.: US 11,517,968 B2
(45) Date of Patent: Dec. 6, 2022

(54) DEBURRING TOOL

(71) Applicants: Hyundai Motor Company, Seoul (KR); Kia Motors Corporation, Seoul (KR)

(72) Inventors: Sung Min Bae, Jeollabuk-do (KR); Jong Youl Park, Jeollabuk-do (KR); Jin Youl Kim, Jeollabuk-do (KR); Seung Ho Lee, Jeollabuk-do (KR); Min Hee Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 47 days.

(21) Appl. No.: 17/099,329

(22) Filed: Nov. 16, 2020

(65) Prior Publication Data
US 2021/0394282 A1 Dec. 23, 2021

(30) Foreign Application Priority Data
Jun. 17, 2020 (KR) .................... 10-2020-0073820

(51) Int. Cl.
*B23B 29/034* (2006.01)
*B23B 51/10* (2006.01)

(52) U.S. Cl.
CPC ...... *B23B 51/101* (2013.01); *B23B 29/03457* (2013.01); *B23B 2251/14* (2013.01)

(58) Field of Classification Search
CPC . B23B 51/105; B23B 51/102; B23B 2220/08; B23B 2220/123; B23B 29/03457; B23B 29/0346; B23B 29/034; B23B 29/03421; B23B 2270/24; B23B 29/03432; Y10T 408/85; Y10T 408/865; Y10T 408/8595
See application file for complete search history.

(56) References Cited

U.S. PATENT DOCUMENTS

| | | | | |
|---|---|---|---|---|
| 4,224,846 A | * | 9/1980 | Eysel | B23Q 1/52 408/180 |
| 4,941,782 A | * | 7/1990 | Cook | B23B 29/03457 82/1.4 |
| 5,417,525 A | * | 5/1995 | Lenhart | B23B 51/102 408/24 |
| 6,238,150 B1 | * | 5/2001 | Yamada | B23B 51/101 408/154 |
| 6,394,710 B1 | * | 5/2002 | Kurz | B23B 29/03457 408/180 |
| 6,402,440 B2 | * | 6/2002 | Soma | B23B 29/03421 408/180 |

(Continued)

FOREIGN PATENT DOCUMENTS

| | | | |
|---|---|---|---|
| KR | 2018-0125591 A | 11/2018 | |
| KR | 2019-0099142 A | 8/2019 | |
| WO | WO-2016135283 A1 | * 9/2016 | ........... B23B 51/101 |

*Primary Examiner* — Eric A. Gates
*Assistant Examiner* — Paul M Janeski
(74) *Attorney, Agent, or Firm* — Fox Rothschild LLP (57) ABSTRACT

A deburring tool includes: a body; and a cutting unit provided on an end portion of the body and including a blade part, where a first channel is provided inside the body, and when a fluid supplied from outside of the deburring tool through the first channel is injected into the cutting unit and presses the cutting unit, the cutting unit moves and a degree to which the blade part protrudes outwardly increases.

14 Claims, 8 Drawing Sheets

(56) References Cited

U.S. PATENT DOCUMENTS

| | | | |
|---|---|---|---|
| 8,506,210 B2* | 8/2013 | Nedzlek | B23B 29/02 |
| | | | 408/83 |
| 8,696,266 B2* | 4/2014 | Beier | B23B 51/101 |
| | | | 408/199 |
| 2004/0028489 A1* | 2/2004 | Brock | B23B 29/03457 |
| | | | 408/154 |
| 2010/0129169 A1* | 5/2010 | Kyoi | B23B 51/105 |
| | | | 407/53 |
| 2017/0297125 A1 | 10/2017 | Schanz | |
| 2019/0105717 A1 | 4/2019 | Schanz | |
| 2019/0255627 A1 | 8/2019 | Studer | |

* cited by examiner

DEBURRING TOOL

CROSS-REFERENCE TO RELATED APPLICATION

This application claims under 35 U.S.C. § 119(a) the benefit of Korean Patent Application No. 10-2020-0073820, filed on Jun. 17, 2020 in the Korean Intellectual Property Office, the entire contents of which are incorporated by reference herein.

BACKGROUND

Technical Field

The present disclosure relates to a deburring tool, more particularly, to the deburring tool used to remove burrs or debris formed during machining of materials.

Description of the Related Art

A deburring tool is designed to remove burrs from a surface of a material/workpiece created by machining operations and make the machined surface smooth. Such a deburring tool is used in various fields. For example, the deburring tool is used to remove burrs formed when machining cross-holes in an interior space of a vehicle engine.

In order to remove burrs from a cross-hole, the deburring tool may be inserted into the cross-hole and then rotated. This may cause a blade mounted on the deburring tool to cut an inner surface of the cross hole, and thus the burrs may be removed.

However, according to the related art, foreign substances or debris collected from the removed burrs may be attached to or around the blade of the deburring tool during a deburring process, and thus the deburring process may not be performed completely or smoothly. In addition, there is a limitation in shape and size of a surface to be machined using one deburring tool.

SUMMARY

An aspect of the present disclosure provides a deburring tool that can smoothly and completely perform deburring, regardless of the presence or absence of foreign substances (e.g., debris or contaminants).

Another aspect of the present disclosure provides a deburring tool that can perform deburring on machined surfaces having various shapes and sizes.

According to an aspect of the present disclosure, a deburring tool may include: a body; and a cutting unit provided on an end portion of the body, wherein the cutting unit may include a blade part which performs cutting by contacting an area to be cut, a first channel may be provided inside the body, and when a fluid supplied from the outside of the deburring tool through the first channel is injected into the cutting unit and presses the cutting unit, the cutting unit may move and a degree to which the blade part protrudes outwardly may increase.

The deburring tool may further include a head coupled to the end portion of the body in a longitudinal direction of the body, wherein the cutting unit may be mounted on an upper portion of the head, a second channel may be provided inside the head, and communicate with the first channel, a first end portion of the second channel may face the first channel, a second end portion of the second channel may face a bottom surface of the cutting unit, and the fluid supplied from the outside of the deburring tool through the first channel may pass through the first channel and the second channel and be injected into the bottom surface of the cutting unit.

The deburring tool may further include a rotating shaft passing through side surfaces of the cutting unit. When the fluid supplied from the outside of the deburring tool through the first channel is injected into the bottom surface of the cutting unit, the cutting unit may rotate with respect to the rotating shaft and the degree to which the blade part protrudes outwardly may increase.

The first channel may have a straight section extending in the longitudinal direction of the body.

The second channel may include: a first parallel extension section facing the first channel and extending parallel to the first channel; and an injection section facing the bottom surface of the cutting unit and extending perpendicular to a direction in which the first parallel extension section extends.

The second channel may further include a second parallel extension section provided between the first parallel extension section and the injection section and extending parallel to the first parallel extension section, and the second parallel extension section may be located lower than the first parallel extension section so that a step may be formed between the first parallel extension section and the second parallel extension section.

The cutting unit may further include a cutting unit body forming a body of the cutting unit, provided separately from the blade part, and having the blade part mounted thereon, and the rotating shaft may pass through side surfaces of the cutting unit body.

The cutting unit may further include a cutting unit body forming a body of the cutting unit, and the blade part and the cutting unit body may form a unitary one-piece structure.

The deburring tool may further include a pressing unit provided on one side of the rotating shaft and pressing the cutting unit in one direction.

The rotating shaft may be provided between an area in which the fluid is injected into the bottom surface of the cutting unit and the pressing unit.

Torque applied to the cutting unit as the fluid is injected into the bottom surface of the cutting unit and torque applied to the cutting unit as the pressing unit presses the cutting unit may be in opposite directions.

The pressing unit may be provided inside the cutting unit, and a lower end portion of the pressing unit may face the upper portion of the head. When the cutting unit rotates with respect to the rotating shaft, the pressing unit may be rotatable with respect to the head, and the pressing unit may press the cutting unit upwardly.

The deburring tool may further include a fixing unit passing through a top surface of the cutting unit and limiting a rotation angle of the cutting unit with respect to the rotating shaft.

The fixing unit may pass through the bottom surface of the cutting unit, and when the rotation angle of the cutting unit with respect to the rotating shaft reaches a predetermined angle, a lower end portion of the fixing unit may interfere with the head to limit the rotation angle of the cutting unit.

The blade part may include an upward protrusion portion, and the upward protrusion portion may be inclined to the left or to the right.

The upward protrusion portion may include: a first side surface which is one side surface of the blade part in a width direction thereof; a second side surface which is the other side surface of the blade part in the width direction thereof, and a top surface which connects the first side surface and the second side surface and forms a top of the upward protrusion portion. The first side surface or the second side surface may have a predetermined angle with respect to a longitudinal direction of the blade part.

The fixing unit may include a bolt having a thread, and a groove corresponding to the thread may be formed on an inner surface of the cutting unit through which the bolt passes.

The top surface may include: a first area which is a front area of the top surface and has a height increasing toward a rear area of the top surface; and a second area which is the rear area of the top surface and has a height increasing toward the front area of the top surface.

A curved surface may be formed on a section in which the first area and the second area meet.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the structure and operations of a deburring tool according to exemplary embodiments of the present disclosure will be described in detail with reference to the accompanying drawings.

Deburring Tool

Figure 1:
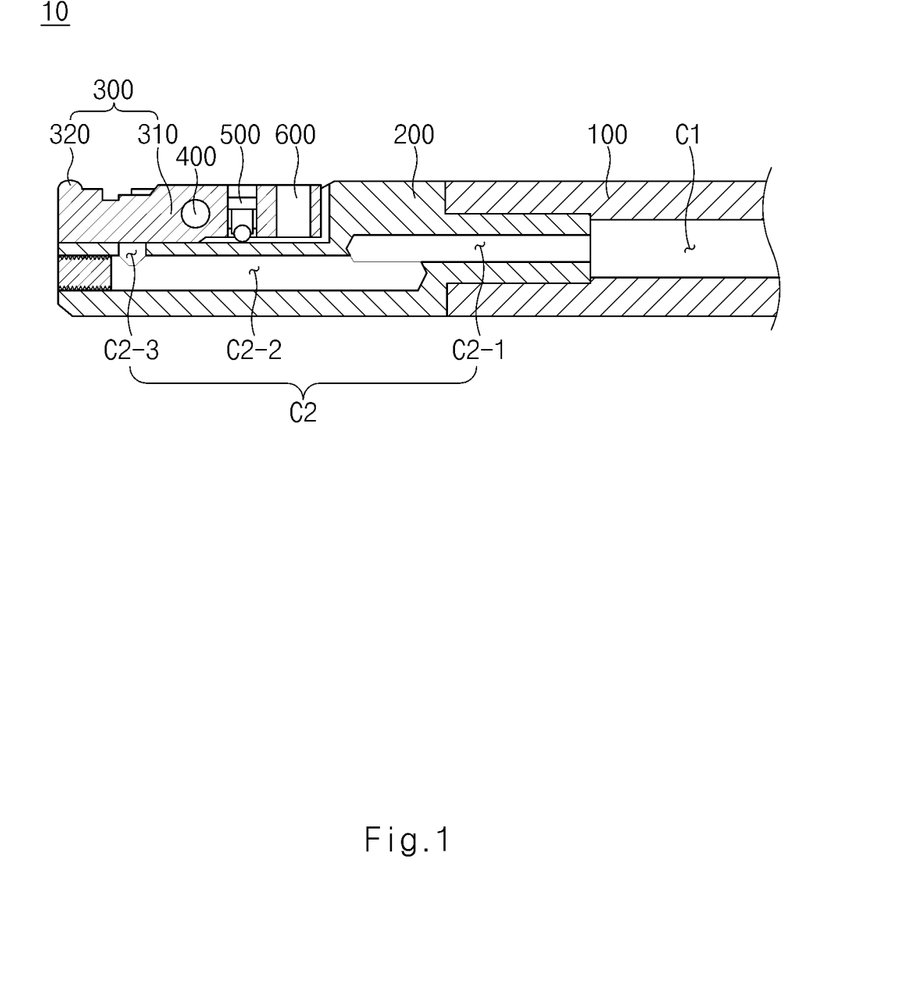
FIG. 1 is a vertical sectional view illustrating a structure of a deburring tool according to an exemplary embodiment of the present disclosure.
Figure 2:
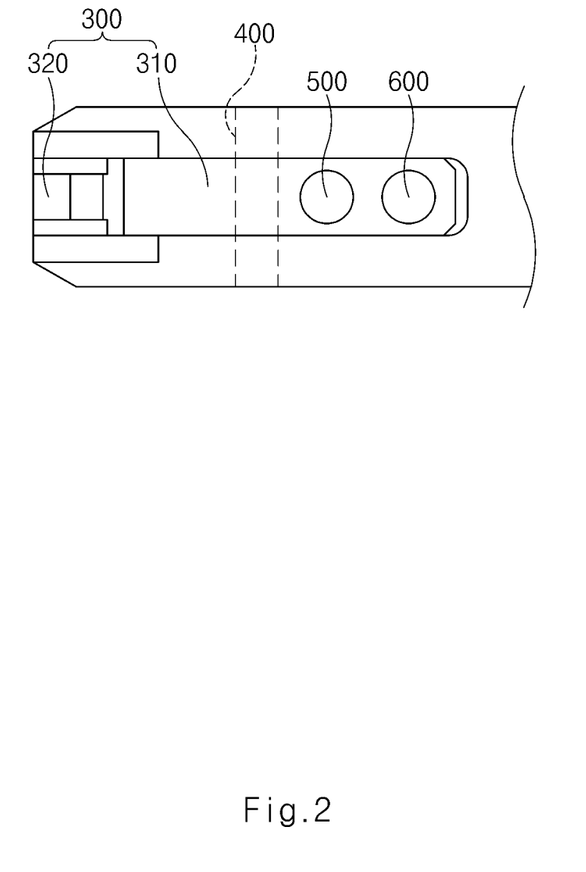
FIG. 2 is a plan view illustrating a cutting unit and its peripheral units of a deburring tool according to an exemplary embodiment of the present disclosure.
Figure 3:
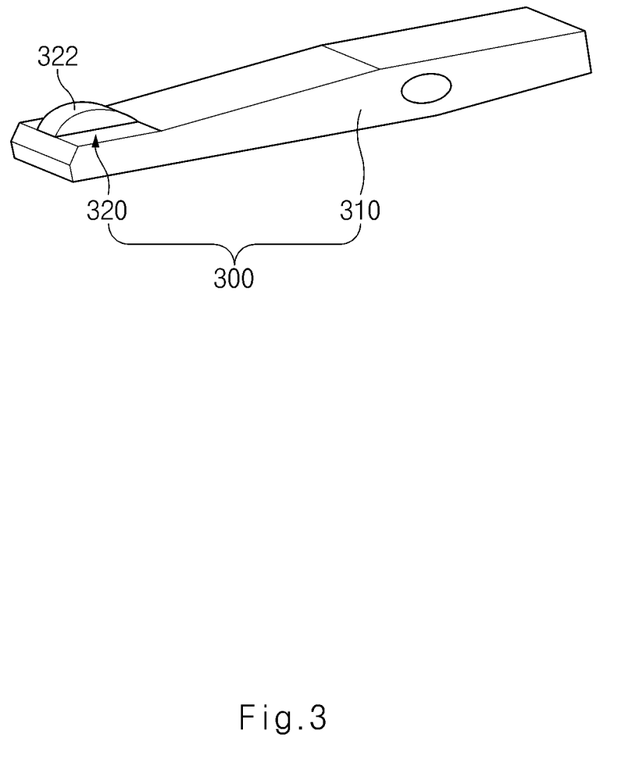
FIG. 3 is a perspective view illustrating a structure of a cutting unit provided in a deburring tool according to an exemplary embodiment of the present disclosure.
Figure 4:
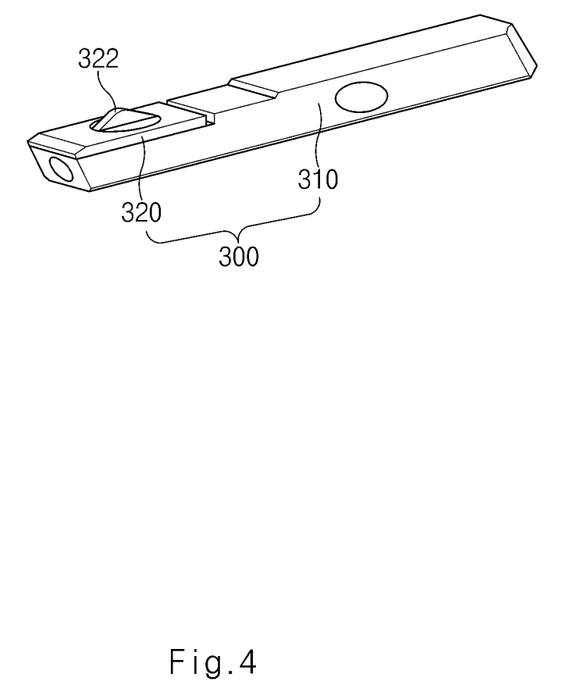
FIG. 4 is a perspective view illustrating a structure of a cutting unit provided in a deburring tool according to another exemplary embodiment of the present disclosure.

FIG. 1 is a vertical sectional view illustrating a structure of a deburring tool according to an exemplary embodiment of the present disclosure, and FIG. 2 is a plan view illustrating a cutting unit and its peripheral units of a deburring tool according to an exemplary embodiment of the present disclosure. FIG. 3 is a perspective view illustrating a structure of a cutting unit provided in a deburring tool according to an exemplary embodiment of the present disclosure, and FIG. 4 is a perspective view illustrating a structure of a cutting unit provided in a deburring tool according to another exemplary embodiment of the present disclosure.

Referring to FIG. 1, a deburring tool 10 according to an exemplary embodiment of the present disclosure may include a body 100. The body 100 may extend in a longitudinal direction thereof (a left-right direction based on FIG. 1). In addition, the deburring tool 10 may include a head 200 coupled to an end portion of the body 100 in the longitudinal direction thereof. In FIG. 1, the head 200 is illustrated as being coupled to a left end portion of the body 100. For example, a concave recess may be formed in one end portion of the body 100, and the head 200 may be inserted and coupled to the recess of the body 100.

According to an exemplary embodiment of the present disclosure, the body 100 may be coupled to a rotatable spindle (not shown). When the spindle rotates, the deburring tool 10 with the body 100 coupled to the spindle may also rotate in an axial direction of the spindle. For example, based on FIG. 1, a right end portion of the body 100 may be coupled to the spindle.

The deburring tool 10 may further include a cutting unit 300 provided on one end portion of the body 100. The cutting unit 300 may perform deburring by cutting a machined surface of a material or workpiece (not shown) when the deburring tool 10 rotates. The cutting unit 300 may be mounted on an upper portion of the head 200. For example, as illustrated in FIG. 1, the upper portion of the head 200 may be provided with an area downwardly recessed, and the cutting unit 300 may be inserted into the recessed area of the head 200.

Meanwhile, the deburring tool 10 according to an exemplary embodiment of the present disclosure may have an internal channel along which a fluid flows.

That is, as illustrated in FIG. 1, a first channel C1 may be formed inside the body 100. The first channel C1 may extend in the longitudinal direction of the body 100. The first channel C1 may serve as an inlet through which the fluid flows into the deburring tool 10 from the outside of the deburring tool. That is, based on FIG. 1, after the fluid is introduced through a right end portion of the first channel C1, the fluid may move to a left end portion of the first channel C1.

In addition, a second channel C2 may be formed inside the head 200. The second channel C2 may communicate with the first channel C1. To this end, a first end portion of the second channel C2 may be provided to face the first channel Cl. In FIG. 1, a right end portion of the second channel C2 may face the left end portion of the first channel C1. In addition, as illustrated in FIG. 1, a second end portion of the second channel C2 may face a bottom surface of the cutting unit 300.

Meanwhile, as illustrated in FIG. 1, a cross-sectional area of the second channel C2 in a width direction thereof may be smaller than that of the first channel C1. In this case, the speed of the fluid flowing into the second channel C2 may be greater than that of the fluid in the first channel C1. Alternatively, however, the cross-sectional area of the second channel C2 in the width direction thereof may be greater than that of the first channel C1, or the cross-sectional area of the second channel C2 in the width direction thereof may be equal to that of the first channel C1.

According to an exemplary embodiment of the present disclosure, the fluid introduced into the channel of the deburring tool 10 may be injected into the cutting unit 300. That is, after the fluid introduced from the outside of the deburring tool into the channel of the deburring tool 10 flows through the first channel C1 and the second channel C2 sequentially, it may be discharged from the head 200 and be injected into the cutting unit 300.

Meanwhile, the second channel C2 may be divided into a plurality of sections. In particular, the second channel C2 may include a first parallel extension section C2-1 facing the first channel Cl and extending parallel to the first channel C1, and an injection section C2-3 facing the bottom surface of the cutting unit 300. The injection section C2-3 may be formed in an outlet area in a direction in which the fluid flows through the second channel C2, and the fluid discharged from the injection section C2-3 may be injected into the cutting unit 300. Meanwhile, the injection section C2-3 may extend perpendicular to a direction in which the first parallel extension section C2-1 extends.

In addition, the second channel C2 may further include a second parallel extension section C2-2 between the first parallel extension section C2-1 and the injection section C2-3. The second parallel extension section C2-2 may extend parallel to the first parallel extension section C2-1. As illustrated in FIG. 1, the second parallel extension section C2-2 may be located lower than the first parallel extension section C2-1. Thus, a step may be formed between the first parallel extension section C2-1 and the second parallel extension section C2-2. Alternatively, the first parallel extension section C2-1 and the second parallel extension section C2-2 may be formed in a straight line without a step. Meanwhile, unlike the second channel C2 divided into the plurality of sections depending on shape, the first channel Cl may only have a straight section extending in the longitudinal direction of the body 100 as illustrated in FIG. 1.

As described above, the cutting unit 300 may perform deburring by cutting the machined surface of the material or workpiece. To this end, as illustrated in FIGS. 1 and 2, the cutting unit 300 may include a blade part 320 that performs cutting in a state of contacting an area to be cut. In particular, a sharp blade may be formed on a portion of a surface of the blade part 320, so that the cutting of the machined surface may be performed by the sharp blade.

In addition, the cutting unit 300 may further include a cutting unit body 310. According to an exemplary embodiment of the present disclosure, the blade part 320 and the cutting unit body 310 may form a unitary one-piece structure as illustrated in FIG. 3. It may be understood that a single base material is processed to form the blade part 320 and the cutting unit body 310.

According to another exemplary embodiment of the present disclosure, the cutting unit body 310 and the blade part 320 may be provided separately as illustrated in FIG. 4. In this case, after the blade part 320 and the cutting unit body 310 are manufactured separately, the blade part 320 may be mounted on top of the cutting unit body 310 to thereby form the cutting unit 300.

As described above, the fluid supplied from the outside of the deburring tool through the first channel C1 of the body 100 may pass through the second channel C2 of the head 200 and be injected into the cutting unit 300. In this case, kinetic energy of the fluid may cause the cutting unit 300 to be pressed in one direction. According to an exemplary embodiment of the present disclosure, by applying pressure, the cutting unit 300 may move in one direction. Thus, the degree to which the blade part 320 extends or protrudes outwardly may increase. Referring to FIG. 1, the fluid discharged from the second channel C2 may be injected into the bottom surface of the cutting unit 300, thereby pressing the bottom surface of the cutting unit 300 upwardly. Accordingly, an area of the cutting unit 300 in which the blade part 320 is provided may move upwardly. Thus, the degree to which the blade part 320 protrudes upwardly may increase.

That is, according to an exemplary embodiment of the present disclosure, the pressure of the fluid directly injected into the bottom surface of the cutting unit 300 may be adjusted according to a user's intention, and thus the degree to which the blade part 320 extends outwardly may be smoothly controlled, and types of machined surfaces that can be cut may be varied.

In particular, as illustrated in FIGS. 1 and 2, the deburring tool 10 may further include a rotating shaft 400 passing through both side surfaces of the cutting unit 300. More preferably, as illustrated in FIG. 2, the rotating shaft 400 may pass through both side surfaces of the cutting unit body 310 and both side surfaces of the head 200 in the width direction thereof.

According to an exemplary embodiment of the present disclosure, when the fluid supplied from the outside of the deburring tool through the first channel C1 of the body 100 is injected into the bottom surface of the cutting unit 300, the cutting unit 300 may rotate with respect to the rotating shaft 400, thereby increasing the degree to which the blade part 320 protrudes outwardly.

Referring to FIGS. 1 and 2, the deburring tool 10 according to an exemplary embodiment of the present disclosure may further include a pressing unit 500 provided on one side of the rotating shaft 400 and pressing the cutting unit 300 in one direction. The pressing unit 500 may be inserted into the inside of the cutting unit 300. In FIG. 1, the pressing unit 500 may be provided in the inside of the cutting unit body 310, and specifically, a lower end portion of the pressing unit 500 may face the upper portion of the head 200 in a state of being fixed into an area of the upper portion of the head 200, and an upper end portion of the pressing unit 500 may face a top surface of the cutting unit body 310. Through the upper end portion of the pressing unit 500, the pressing unit 500 may press the cutting unit 300 upwardly. In particular, the greater the rotation of the cutting unit 300 with respect to the rotating shaft 400, the greater a pressing force of the pressing unit 500 with respect to the cutting unit 300. For example, the pressing unit 500 may include an elastic material such as a spring. Meanwhile, since the pressing unit 500 is provided in the inside of the cutting unit body 310 as described above, when the cutting unit 300 rotates with respect to the rotating shaft 400, the pressing unit 500 may also be rotatable with respect to the head 200. To this end, as illustrated in FIGS. 5 and 6, a separate rotating shaft may be provided between the pressing unit 500 and the head 200.

Meanwhile, according to an exemplary embodiment of the present disclosure, torque applied to the cutting unit 300 in relation to the rotating shaft 400 as the fluid is discharged from the second channel C2 and injected into the bottom surface of the cutting unit 300 and torque applied to the cutting unit 300 in relation to the rotating shaft 400 as the pressing unit 500 presses the cutting unit 300 may be in opposite directions. To this end, the rotating shaft 400 may be disposed between an area in which the fluid is injected into the bottom surface of the cutting unit 300 (that is, the injection section C2-3) and the pressing unit 500. In FIGS. 1 and 2, the injection section C2-3 is provided on the left of the rotating shaft 400, and the pressing unit 500 is provided on the right of the rotating shaft 400. Since the fluid and the pressing unit 500 press the cutting unit 300 upwardly, when the injection section C2-3 and the pressing unit 500 are spaced apart from each other with the rotating shaft 400 therebetween, the directions of torque applied to the cutting unit 300 may be opposite to each other.

Meanwhile, the blade part 320 may be adjacent to the injection section C2-3. For example, as illustrated in FIGS. 1 and 2, the blade part 320 may also be provided on the left of the rotating shaft 400, like the injection section C2-3. A distance between the blade part 320 and the rotating shaft 400 may be greater than a distance between the injection section C2-3 and the rotating shaft 400.

Figure 5:
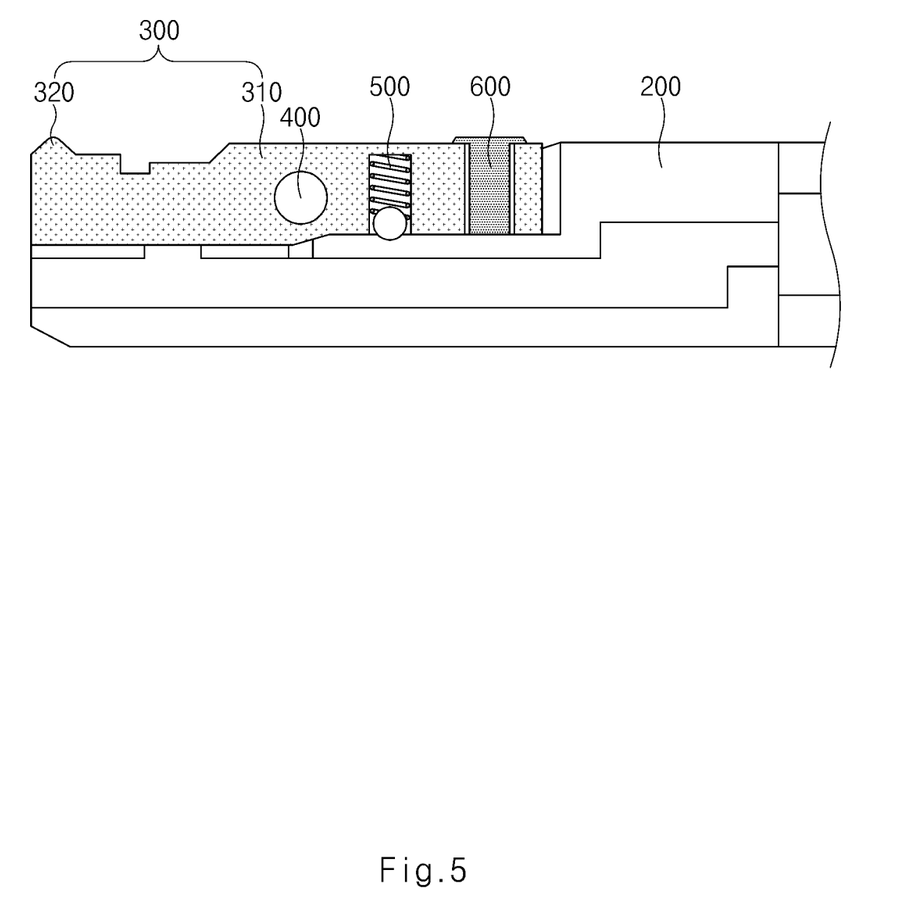
FIG. 5 is a vertical sectional view illustrating a state of a cutting unit before a fluid flows into a deburring tool according to an exemplary embodiment of the present disclosure.
Figure 6:
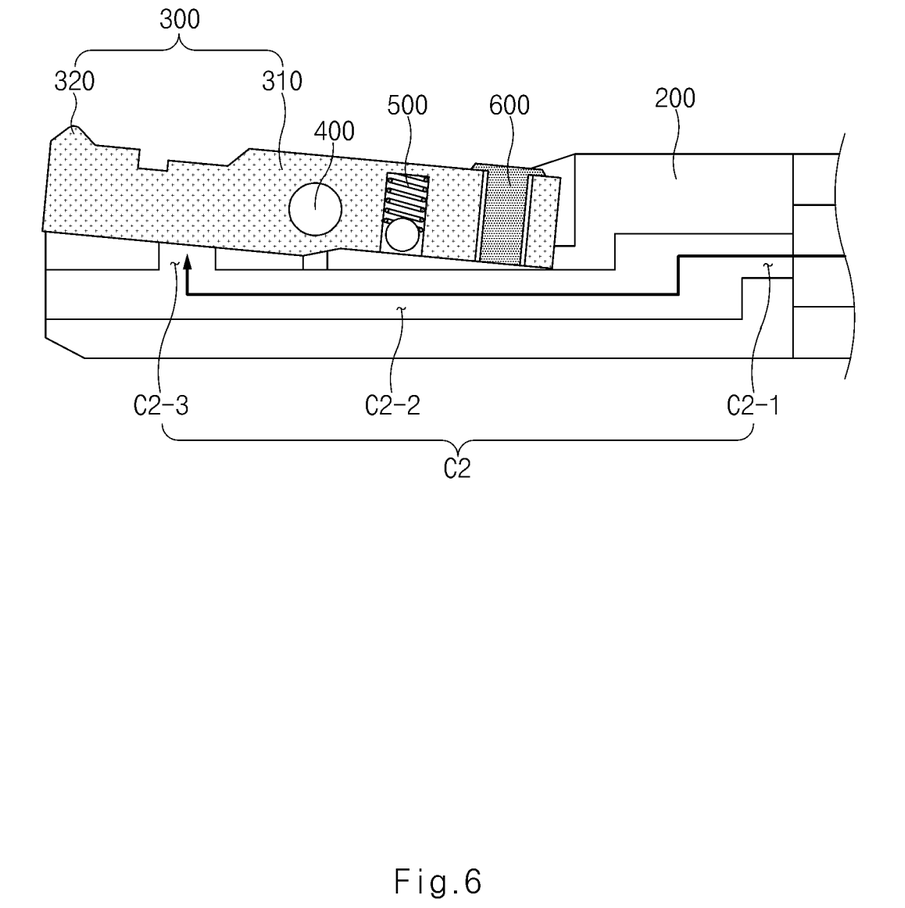
FIG. 6 is a vertical sectional view illustrating a state of a cutting unit when a fluid flows into a deburring tool according to an exemplary embodiment of the present disclosure.

FIG. 5 is a vertical sectional view illustrating a state of a cutting unit before a fluid flows into a deburring tool according to an exemplary embodiment of the present disclosure, and FIG. 6 is a vertical sectional view illustrating a state of a cutting unit when a fluid flows into a deburring tool according to an exemplary embodiment of the present disclosure.

As illustrated in FIG. 5, when the fluid does not flow into the deburring tool 10, the cutting unit 300 may not move, but may be fixed to the head 200. Then, as illustrated in FIG. 6, when the fluid flows into the deburring tool 10, the cutting unit 300 may receive a force exerted upwardly on the area facing the injection section C2-3 by the pressure of the fluid. Thus, the area of the cutting unit 300 provided on the left of the rotating shaft 400 may rotate upwardly, and the area of the cutting unit 300 provided on the right of the rotating shaft 400 may rotate downwardly. Accordingly, the blade part 320 provided on the left area of the cutting unit 300 in relation to the rotating shaft 400 may protrude more as illustrated in FIG. 2.

Meanwhile, as the area of the cutting unit 300 provided on the right of the rotating shaft 400 rotates downwardly, the pressing unit 500 provided inside the cutting unit 300 may be pressed downwardly by the cutting unit 300. When the pressing unit 500 includes the elastic material such as a spring, the force of the pressing unit 500 pressing the cutting unit 300 upwardly may also increase due to a compressive force of the elastic material. Thus, even though the cutting unit 300 is pressed upwardly by the fluid, the cutting unit 300 may not continue to rotate, but may only rotate until the torque applied to the cutting unit 300 by the pressure of the fluid is equal to the torque applied to the cutting unit 300 by the compressive force of the pressing unit 500.

Based on the above description, the degree of rotation of the cutting unit 300 in the deburring tool 10 may be determined by the fluid which is discharged after flowing through the first channel and the second channel. By adjusting the amount and rate of the fluid, the degree of rotation of the cutting unit 300 with respect to the rotating shaft 400 may be controlled, and accordingly, the degree to which the blade part 320 protrudes outwardly may also be controlled. Thus, the deburring process may be performed on machined surfaces having various shapes and sizes.

In addition, as described above, the blade part 320 in the deburring tool 10 may be adjacent to the injection section C2-3. Since a portion of the fluid discharged from the injection section C2-3 reaches the blade part 320, foreign substances or debris created in the deburring process may be removed by the fluid injected from the injection section C2-3 and reaching the blade part 320 even though the foreign substances or debris are attached to the blade part 320 or exist near the blade part 320. That is, the injected fluid may play a role of removing the foreign substances or debris around the blade part 320 as well as controlling the degree to which the blade part 320 protrudes outwardly.

Referring to FIGS. 1 and 2, the deburring tool 10 according to an exemplary embodiment of the present disclosure may further include a fixing unit 600 passing through the top surface of the cutting unit 300. The fixing unit 600 may determine an upper limit of a rotation angle of the cutting unit 300 with respect to the rotating shaft 400.

That is, as illustrated in FIGS. 1, 5, and 6, the fixing unit 600 may pass through the bottom surface of the cutting unit 300 as well as the top surface of the cutting unit 300. When the rotation angle of the cutting unit 300 with respect to the rotating shaft 400 reaches a predetermined angle, a lower end portion of the fixing unit 600 may interfere with the head 200 to limit the rotation angle of the cutting unit 300. That is, even when the torque applied to the cutting unit 300 by the fluid which is discharged from the second channel C2 and injected into the bottom surface of the cutting unit 300 is excessive and is no longer in equilibrium with the torque applied to the cutting unit 300 by the pressing unit 500, the range of rotation of the cutting unit 300 may be limited by the fixing unit 600. Meanwhile, as illustrated in FIG. 5, the fixing unit 600 may be provided on the right of the rotating shaft 400, and a distance between the fixing unit 600 and the rotating shaft 400 may be greater than a distance between the pressing unit 500 and the rotating shaft 400.

Meanwhile, in the deburring tool 10 according to an exemplary embodiment of the present disclosure, a distance between the lower end portion of the fixing unit 600 and the head 200 may be adjusted. For example, the fixing unit 600 may include a bolt having a thread, and a groove corresponding to the thread may be formed on an inner surface of the cutting unit 300, that is, an inner surface of the cutting unit body 310. In this case, the distance between the lower end portion of the fixing unit 600 and the head 200 may be adjusted by the rotation of the bolt provided in the fixing unit 600. Thus, the range (upper limit) of rotation of the cutting unit 300 may be adjusted according to the shape and size of a machined surface to be deburred by the deburring tool 10.

Figure 7:
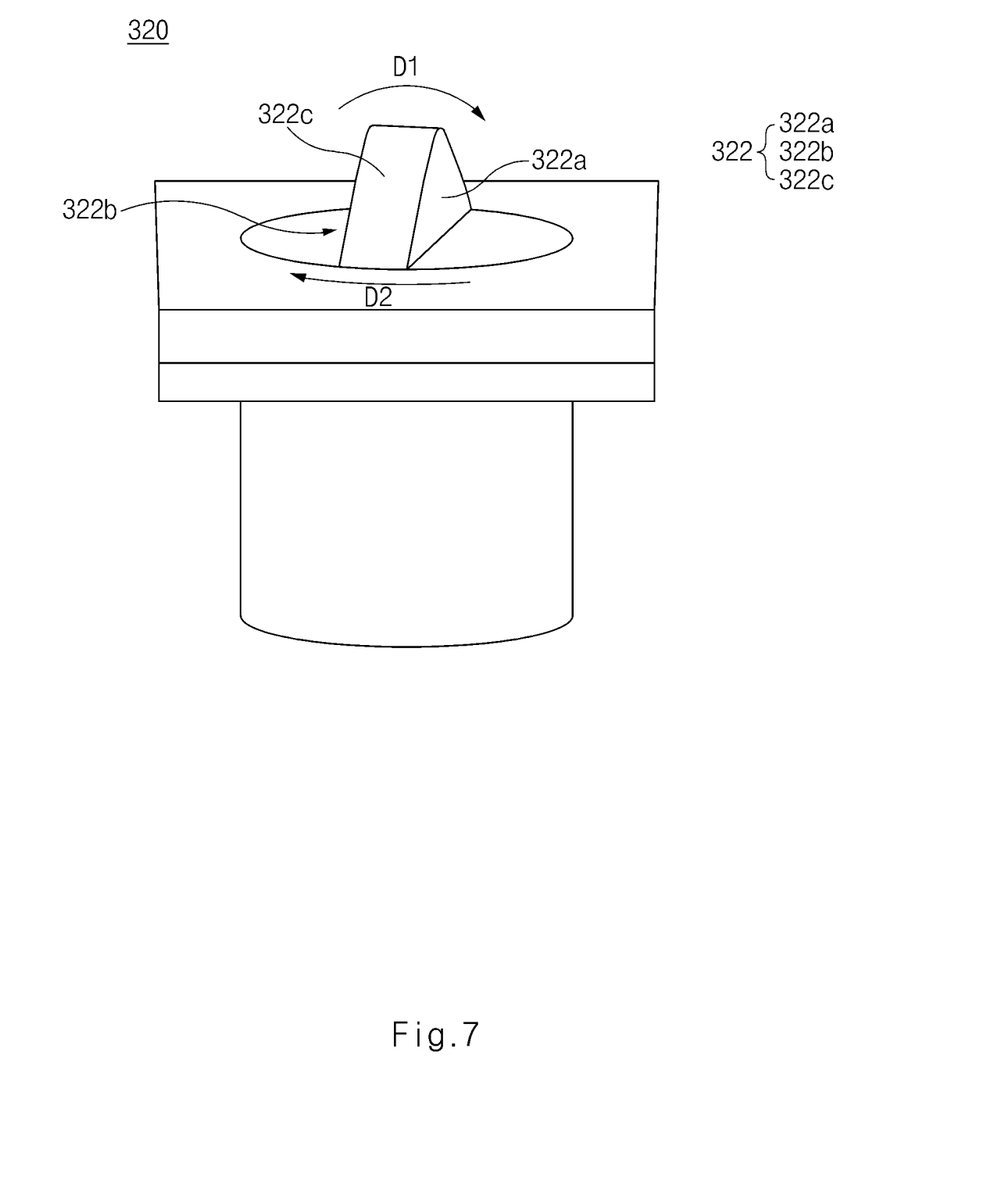
FIG. 7 is an enlarged perspective view illustrating a blade part provided in a deburring tool according to an exemplary embodiment of the present disclosure.
Figure 8:
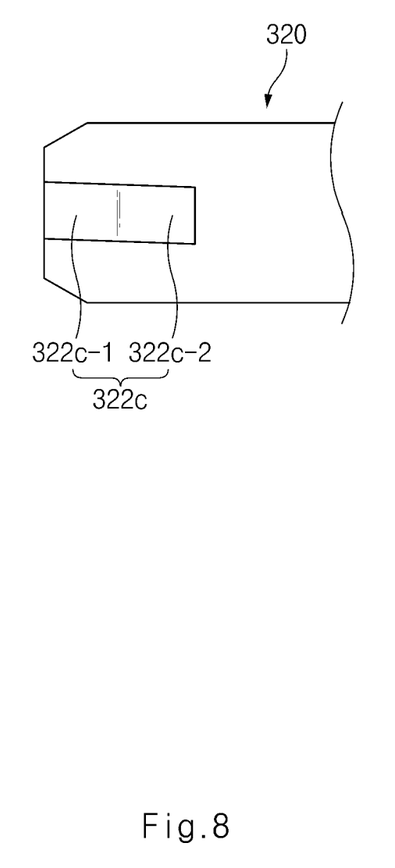
FIG. 8 is an enlarged plan view illustrating a blade part provided in a deburring tool according to an exemplary embodiment of the present disclosure.

FIG. 7 is an enlarged perspective view illustrating a blade part provided in a deburring tool according to an exemplary embodiment of the present disclosure, and FIG. 8 is an enlarged plan view illustrating a blade part provided in a deburring tool according to an exemplary embodiment of the present disclosure.

As illustrated in FIGS. 7 and 8, the blade part 320 may include an upward protrusion portion 322. The upward protrusion portion 322 of the blade part 320 may perform deburring by directly contacting the machined surface.

The upward protrusion portion 322 may include a first side surface 322a which is one side surface of the blade part 320 in a width direction thereof and a second side surface 322b which is the other side surface of the blade part 320 in the width direction thereof. Based on FIG. 7, the first side surface 322a is a right side surface of the upward protrusion portion 322, and the second side surface 322b is a left side surface of the upward protrusion portion 322.

In addition, the upward protrusion portion 322 may further include a top surface 322c connecting the first side surface 322a and the second side surface 322b and forming a top of the upward protrusion portion 322. Here, the upward protrusion portion 322 may be divided into a plurality of areas around a central area of the upward protrusion portion 322. For example, the top surface 322c may include a first area 322c-1 which is a front area of the top surface 322c and has a height increasing toward a rear area of the top surface 322c, and a second area 322c-2 which is the rear area of the top surface 322c and has a height increasing toward the front area of the top surface 322c.

Meanwhile, according to an exemplary embodiment of the present disclosure, the upward protrusion portion 322 may be inclined to the left or to the right. For example, when viewed from the left of the deburring tool 10 in FIG. 1, the upward protrusion portion 322 may be inclined in a right direction D1 as illustrated in FIG. 7. An angle of inclination of the upward protrusion portion 322 to the left or to the right may be 5 to 10 degrees.

In addition, according to an exemplary embodiment of the present disclosure, the first side surface 322a or the second side surface 322b of the upward protrusion portion 322 may have a predetermined angle with respect to a longitudinal direction of the blade part 320. It may be understood that compared to a case in which the upward protrusion portion 322 is parallel to the longitudinal direction of the blade part 320, the upward protrusion portion 322 may be rotated by the predetermined angle as illustrated in FIG. 7. For example, when viewed from the left of the deburring tool 10 in FIG. 1, the first area 322c-1 of the upward protrusion portion 322 may be rotated by a predetermined angle in a left direction D2 and the second area 322c-2 of the upward protrusion portion 322 may be rotated by the predetermined angle in the right direction D1 as illustrated in FIGS. 7 and 8. Here, the predetermined angle may be 5 to 10 degrees.

As described above, the reason why the upward protrusion portion 322 is inclined to the left or to the right and why the upward protrusion portion 322 is rotated by the predetermined angle so that the first side surface 322a or the second side surface 322b may have the predetermined angle with respect to the longitudinal direction of the blade part 320 may be to ensure that the entirety of the machined surface is deburred by allowing both side surfaces of the upward protrusion portion 322 to be used uniformly during the deburring process by the deburring tool 10.

For example, when viewed from the left of the deburring tool 10 in FIG. 1, when the deburring tool 10 rotates counterclockwise and moves forward to the left, the deburring process may be performed by cutting the machined surface in an area of the upward protrusion portion 322 in which the first area 322c-1 and the second side surface 322b meet. On the other hand, when viewed from the left of the deburring tool 10 in FIG. 1, when the deburring tool 10 rotates clockwise and moves backward to the right, the deburring process may be performed by cutting the machined surface in an area of the upward protrusion portion 322 in which the second area 322c-2 and the first side surface 322a meet. In particular, an area of the machined surface (for example, an upper area of the machined surface), which is deburred when the deburring tool 10 rotates counterclockwise and moves forward to the left, and an area of the machined surface (for example, a lower area of the machined surface), which is deburred when the deburring tool 10 rotates clockwise and moves backward to the right, may not overlap each other. Thus, both side surfaces of the upward protrusion portion 322 may be used uniformly and the entirety of the machined surface may be deburred during the deburring process.

Meanwhile, as illustrated in FIG. 7, a curved surface may be formed on a section in which the first area 322c-1 and the second area 322c-2 meet on the top surface 322c of the upward protrusion portion 322. This may be to prevent scratches from being formed by the deburring tool in an area of the machined surface other than an area of the machined surface which is subjected to deburring. More preferably, the radius of curvature of the curved surface may be 0.4 mm to 1.5 mm.

As set forth above, the deburring tool according to exemplary embodiments of the present disclosure can smoothly perform deburring, regardless of the presence or absence of foreign substances (debris).

According to exemplary embodiments of the present disclosure, the deburring tool can perform deburring on machined surfaces having various shapes and sizes.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A deburring tool, comprising:
a body;
a cutting unit provided on an end portion of the body and including a first surface and a second surface, wherein the first surface of the cutting unit includes a blade part which performs cutting by contacting an area to be cut,
a first channel provided inside the body,
a head coupled to the end portion of the body in a longitudinal direction of the body, wherein the cutting unit is mounted on a recessed portion of the head,
a second channel provided inside the head, and in communication with the first channel, the second channel including:
a first end portion adjacent to the first channel,
a second end portion adjacent to the second surface of the cutting unit, and
further comprising a shaft passing through side surfaces of the cutting unit,
wherein, when a fluid supplied from outside of the deburring tool through the first channel is injected into the cutting unit and presses the cutting unit;
the fluid passes through the first channel and the second channel and is injected into the second surface of the cutting unit,
the cutting unit rotates with respect to the shaft, and a degree to which the blade part protrudes outwardly increases.

2. The deburring tool according to claim 1, wherein the cutting unit further includes a cutting unit body forming a body of the cutting unit, provided separately from the blade part, and having the blade part mounted thereon, and the shaft passes through side surfaces of the cutting unit body.

3. The deburring tool according to claim 1, wherein the cutting unit further includes a cutting unit body forming a body of the cutting unit, and the blade part and the cutting unit body form a unitary one-piece structure.

4. The deburring tool according to claim 1, further comprising a pressing unit provided on one side of the shaft and pressing the cutting unit in one direction.

5. The deburring tool according to claim 4, wherein the shaft is provided between an area in which the fluid is injected into the second surface of the cutting unit and the pressing unit.

6. The deburring tool according to claim 5, wherein torque applied to the cutting unit as the fluid is injected into the second surface of the cutting unit and torque applied to the cutting unit as the pressing unit presses the cutting unit are in opposite directions.

7. The deburring tool according to claim 4, wherein the pressing unit is provided inside the cutting unit,
   a first end portion of the pressing unit faces the recesses portion of the head,
   when the cutting unit rotates with respect to the shaft, the pressing unit is rotatable with respect to the head, and
   the pressing unit presses the cutting unit away from the recessed portion of the head.

8. The deburring tool according to claim 1, further comprising a fixing unit passing through the first surface of the cutting unit and limiting a rotation angle of the cutting unit with respect to the shaft.

9. The deburring tool according to claim 8, wherein the fixing unit passes through the second surface of the cutting unit, and when the rotation angle of the cutting unit with respect to the shaft reaches a threshold angle, a lower end portion of the fixing unit interferes with the head to limit the rotation angle of the cutting unit.

10. The deburring tool according to claim 9, wherein the fixing unit includes a bolt having a thread, and
    a groove corresponding to the thread is formed on an inner surface of the cutting unit through which the bolt passes.

11. A deburring tool, comprising:
    a body;
    a cutting unit provided on an end portion of the body and including a first surface and a second surface, wherein the first surface of the cutting unit includes a blade part which performs cutting by contacting an area to be cut,
    a first channel provided inside the body,
    a head coupled to the end portion of the body in a longitudinal direction of the body, wherein the cutting unit is mounted on a recessed portion of the head,
    a second channel provided inside the head, and in communication with the first channel, the second channel including:
      a first end portion adjacent to the first channel,
      a second end portion adjacent to the second surface of the cutting unit, and
    wherein, when a fluid supplied from outside of the deburring tool through the first channel passes is injected into the cutting unit and presses the cutting unit, the fluid passes through the first channel and the second channel and is injected into the second surface of the cutting unit;
    wherein the first channel has a straight section extending in the longitudinal direction of the body, and
    wherein the second channel further includes:
      a first parallel extension section adjacent to the first channel and extending parallel to the first channel; and
      an injection section adjacent to the second surface of the cutting unit and extending perpendicular to a direction in which the first parallel extension section extends.

12. The deburring tool according to claim 11, wherein the second channel further includes a second parallel extension section provided between the first parallel extension section and the injection section, and extending parallel to the first parallel extension section, wherein the second parallel extension section is transversely offset from a direction of the first parallel extension section so that a step is formed between the first parallel extension section and the second parallel extension section.

13. A deburring tool, comprising:
    a body;
    a cutting unit provided on an end portion of the body and including a first surface and a second surface, wherein the first surface of the cutting unit includes a blade part which performs cutting by contacting an area to be cut, and
    first channel provided inside the body,
    wherein, when a fluid supplied from outside of the deburring tool through the first channel is injected into the cutting unit and presses the cutting unit, the cutting unit moves and a degree to which the blade part protrudes outwardly increases;
    wherein the blade part includes a protrusion portion extending away from the first surface of the cutting unit;
    wherein the protrusion portion includes:
      a first side surface which is one side surface of the blade part in a width direction thereof;
      a second side surface which is the other side surface of the blade part in the width direction thereof; and
      a top surface which connects the first side surface and the second side surface and forms a top of the protrusion portion, and
      the first side surface or the second side surface is oriented at a non-zero angle with respect to a longitudinal direction of the blade part;
    wherein the top surface includes:
      a first area which is a front area of the top surface and has a height increasing toward a rear area of the top surface; and
      a second area which is the rear area of the top surface and has a height increasing toward the front area of the top surface.

14. The deburring tool according to claim 13, wherein a curved surface is formed on a section in which the first area and the second area meet.

* * * * *